April 25, 1967  O. K. ALLEN  3,315,891
PROCESS PROGRAM CONTROLLER
Filed Aug. 30, 1965
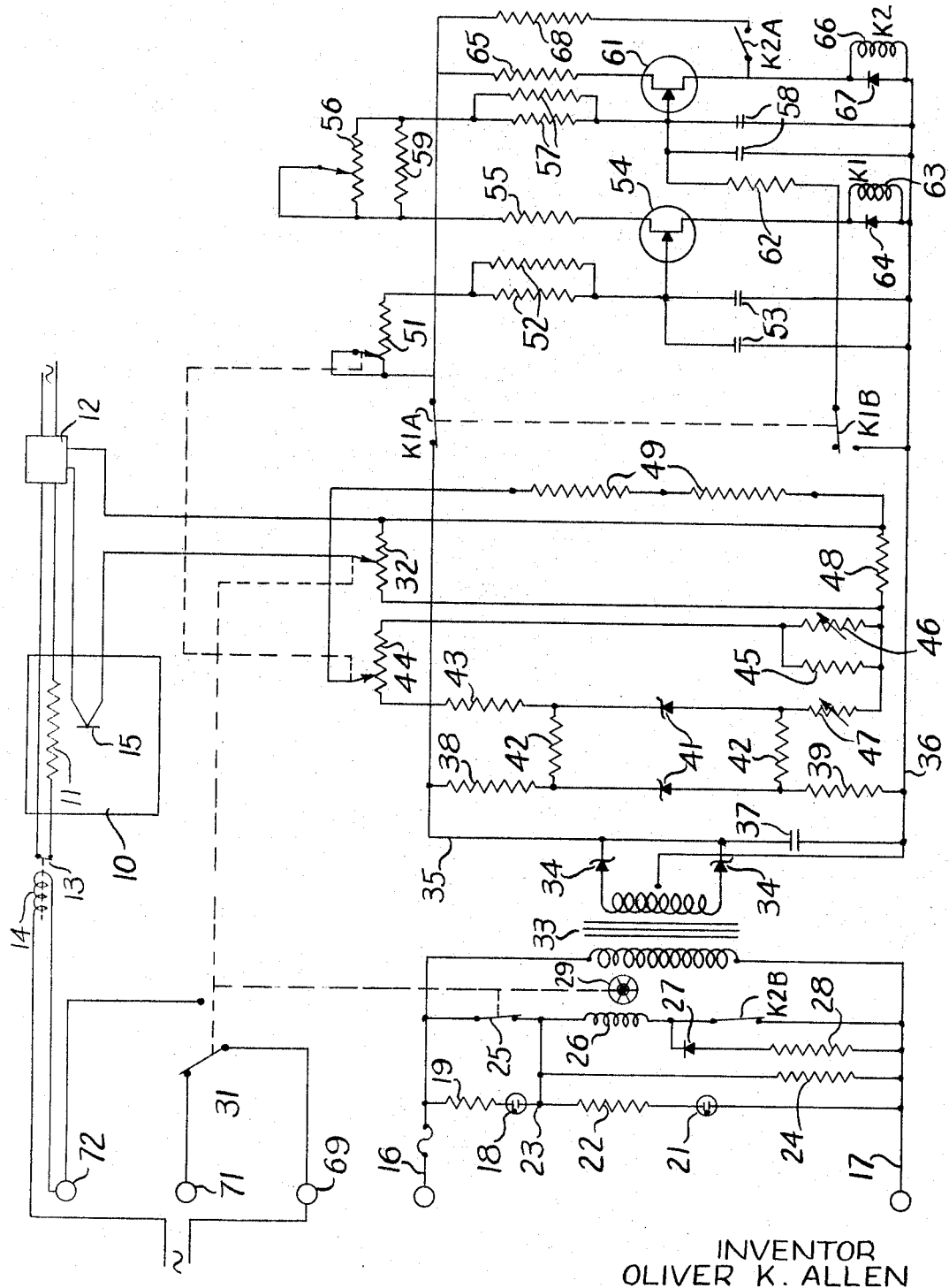
INVENTOR
OLIVER K. ALLEN
BY
*Burns, Freeman & McInnes*
Attys.

United States Patent Office 3,315,891
Patented Apr. 25, 1967

3,315,891
PROCESS PROGRAM CONTROLLER
Oliver K. Allen, La Habra, Calif., assignor to Basic Products Corporation, a corporation of Wisconsin
Filed Aug. 30, 1965, Ser. No. 483,640
12 Claims. (Cl. 236—46)

This invention relates to a process program controller and more particularly to a system for controlling the rate of change of a condition.

In many types of processes, it becomes important to control the rate at which a condition changes, for example, in heating or cooling operations the rate of change of temperature can have a very important effect on the material being treated. It is, therefore, one of the objects of the present invention to provide a relatively simple and highly reliable mechanism for accurately controlling the rate of change of any desired condiition.

Another object is to provide a process program controller in which the apparatus produces a progressively varying signal which is combined with a signal proportional to the condition to provide a progressively varying control signal which controls the condition.

A specific object is to provide a process program controller in which an electrical signal proportional to the value of the condition, such as that produced by a thermocouple in heating or cooling operations, is combined with a progressively varying electric signal and the condition to be controlled, such as the temperature of a space, is caused to vary at a predetermined rate by the combined signal.

A further object is to provide a process program controller in which a progressively varying signal is produced by a pair of timing devices functioning at different rates and which control the operation of a motor which, in turn, adjusts a signal.

According to a feature of the invention, the faster operated timing device stops the motor at the end of its time cycle and the slower operated timing device resets the faster operated device and restarts the motor. The average operating rate of the motor is therefore proportional to the relative time cycles of the timing devices.

According to another feature of the invention, the time cycle of the slower operating device and the range of program variation are simultaneously adjusted.

The above and other objects and features of the invention will be more readily apparent from the following description when read in connection with the accompanying drawing in which:

The figure is a circuit diagram of a process program controller embodying the invention.

The controller, as illustrated, is adapted to control the rate of change of temperature in furnaces or other space indicated at 10. The space is supplied with heat by any desired heating means such as, for example, a resistance unit 11 connected in an electric circuit through a controller 12 and a cutoff such as 13. The controller 12 may be any one of a plurality of different types of controllers which is responsive to an electrical signal to control the rate of heat input to the resistance unit 11, either by a periodic on-off operation or by modulating the heating current supplied to the resistance unit 11. The switch 13 is normally closed and is adapted to be opened by a solenoid coil 14 when it is energized. The temperature in the furnace or space 10 is measured by a thermocouple 15 which is inserted in the space and whose terminals are connected to the controller 12. The controller 12 can be set to maintain a predetermined temperature in the space and will respond to the signals supplied to it to maintain the set temperature.

The program control apparatus of the present invention is adapted to modify the signal supplied to the controller 12 by the thermocouple 15 to provide a progressively varying change of temperature in the space 10 through a constant setting of the controller 12 and to shut off the supply of power to the heating element 11 at the end of a predetermined operation. For example, for heating space 10, at a progressively varying rate, the controller might produce a voltage which added to the thermocouple voltage would satisfy the set point of the controller 12 even though the temperature in the space is well below the set point. The signal produced by the program controller would in this case be gradually reduced so that the temperature in the space would have been gradually increased at a corresponding rate to satisfy the controller 12. Alternatively for cooling, the program controller might produce a very low or zero signal at the start of a cooling operation and a progressively increasing signal as the operation proceeds. Therefore, the controller 12 would be satisfied with a progressively decreasing voltage from the thermocouple to provide a graduated rate of cooling for the space 10 proportional to the rate of change of signal by the program controller. At the end of the cooling cycle, the switch 13 could be opened to terminate any heat input to the space.

The program controller is powered from a source including the lines 16 and 17 which could be conventional 115 volt, 60 cycle alternating current supply. A signal lamp 18 is connected through a resistor 19 to the line 16 and a similar signal lamp 21 is connected to the line 17 and through a resistor 22 to a common point 23 between signal lamp 18 and resistor 22. The common point 23 is connected through a resistor 24 to the line 17 and is also connected to one side of a normally closed switch 25 whose other side is connected to the line 16 and to one side of a switch K2B whose other side is connected to the line 17. As shown, a motor winding 26 is connected to the common point 23 and to one side of the switch K2B with a rectifier 27 and resistor 28 being connected in shunt with the switch K2B. This circuit is provided to provide a flow of direct current through the motor winding when the switch K2B is opened to brake the motor and cause it to stop promptly upon opening of the switch K2B. The motor has a rotor 29 which is mechanically connected as indicated by the dotted lines to the switch 25, to a second cutoff switch 31 and to the wiper of a potentiometer 32 whose purpose will appear hereinafter. The lines 16 and 17 are also connected directly to the primary of a transformer 33 whose secondary provides operating voltage for the program signal varying circuit.

The outer terminals of the secondary winding of the transformer 33 are connected through rectifiers 34 to a line 35 which constitutes one side of a power source for the program controller. A center tap on the transformer secondary is connected to a line 36 which constitutes the other side of the program controller power source. A filter capacitor 37 and a filter circuit including resistors 38 and 39 filter the direct current output with the voltage being limited and accurately controlled by Zener diodes 41. The left hand Zener diode 41, as shown, is connected between the resistors 38 and 39 and points between the respective resistors and the Zener diodes are connected through resistor 42 to opposite sides of the right hand Zener diode 41. The upper resistor 42 is connected through a resistor 43 to one side of a potentiometer 44 which adjusts the range of the program controller as will be more readily apparent hereinafter. The other side of the potentiometer 44 is connected through a fixed resistor 45 and a small trim resistor 46 and through a resistor 47 to the lower resistor 42. In this way, an accurately controlled voltage is supplied to the potentiometer 44.

One side of the potentiometer 32 is also connected directly through the resistor 46 to the right side of the lower resistor 42 and the other side of this potentiometer is connected through a resistor 48 to the resistor 47 and through resistors 49 to the wiper of potentiometer 44. In this way, adjustment of the potentiometer 44 adjusts the total voltage across the potentiometer 32. One side of the potentiometer 32 and the wiper therein are connected in circuit with the thermocouple 15 to combine the potentiometer voltage with the thermocouple voltage.

A third potentiometer 51 is connected at one side through a relay switch K1A to the line 35 and a wiper on this potentiometer is mechanically connected to the wiper potentiometer 44 for simultaneous adjustment therewith. The wiper is connected to said one side of the potentiometer and the other side is connected through resistors 52 and capacitors 53 which constitute a time delay circuit to the line 36. A point between the resistors 52 and capacitors 53 is connected to the base of a unijunction transistor 54, one of whose electrodes is connected through a resistor 55 to one side of a rate adjusting potentiometer 56. The wiper on the potentiometer 56 is connected to the same side of the potentiometer resistor and the other side of the resistor is connected through resistors 57 and capacitors 58 to the line 36. A resistor 59 may parallel the potentiometer resistor 56 to adjust the maximum range thereof.

A point between the resistors 57 and capacitors 58 is connected to the base of a unijunction transistor 61 and is also connected through a resistor 62 and a normally open relay switch K1B to the line 36. The switches K1A and K1B are operated by a relay coil 63 connected between the transistor 54 and the line 36 and which has a rectifier 64 in shunt therewith to discharge residual current in the coil 63 when the transistor 54 shuts off.

The transistor 61 is connected through a resistor 65 and through the switch K1A to the line 35 and is also connected through a relay coil 66 having a rectifier 67 in parallel therewith to the line 36. The relay coil 66 when energized closes a holding switch K2A which is connected through a resistor 68 in shunt with the resistor 65 and transistor 61 and also opens the relay switch K2B.

The switch 31 may be operated to control any desired control or indicating function. As shown, it is a two position switch normally connecting terminals 69 and 71. When the switch 31 is operated by the motor 29 it opens the circuit between terminals 69 and 71 and closes a circuit between terminals 71 and 72. As shown, the circuit functions to control the relay coil 14 which opens the switch 13 when it is energized and it will be understood that the terminals could also be conected to other indicating or control devices to indicate or control operation of the furnace 10 or other processes whose rate is to be controlled. As shown, the terminal 69 is connected to the blade of the switch 31 which is also connected to one side of a source of power and the other side of the power source is connected through the coil 14 and terminal 72 to the normally open switch contact. With this circuit, the coil 14 is normally deenergized and is energized at the completion of a complete operating cycle when the motor operates the switch 31.

In operation, assuming that the furnace space 10 is to be heated at a controlled rate to a predetermined maximum temperature, the potentiometer 32 will be set so that its output voltage when combined with the extremely low or substantially zero voltage of the thermocouple at the starting temperature satisfies or substantially satisfies the controller 12. Under these conditions the heat input to the furnace will be zero or very low and will be shut off when the combined signals from the potentiometer 32 and thermocouple 15 are sufficient to satisfy the controller 12. It can also be assumed that both relays K1 and K2 are deenergized so that circuit is in the condition illustrated.

The time cycle of the rate control circuit comprises the potentiometer 56, resistors 57 and capacitors 58 and may be adjusted to determine the period during which the motor 29 remains energized during each complete timing cycle. It will be noted that with the circuit in the condition shown, with the switch K2B closed, the motor winding 26 is energized and the motor armature 29 is turning. After a predetermined time, determined by the setting of the rate potentiometer 56, the capacitors 58 will become charged to produce a positive voltage on the base of the transistor 61 to make it conductive. At this time, the relay coil 66 will be energized to open the switch K2B and stop the motor and simultaneously to close the switch K2A to complete a holding circuit which maintains the relay coil energized.

The parts will remain in this condition until the time delay circuit comprising the potentiometer 51, resistors 52, and capacitors 53 reaches the end of the time cycle for which it is set. At this time, the capacitors 53 will be charged and will impress a positive voltage on the base of the transistor 54 to cause it to conduct. This will energize the relay coil K1 to open the switch K1A and close the switch K1B. Opening of the switch K1A will deenergize both coils K1 and K2 to initiate the operation of a new time cycle. Closing of the switch K1B will insure that the capacitors 58 are fully discharged so that the rate cycle, as determined by the time constants of potentiometer 56, resistors 57 and capacitors 58, will be accurately controlled. The capacitors 53 will discharge through the transistor 54.

The circuit is now back to its initial condition, as shown in the drawings, for starting of a new time cycle with the motor winding 26 energized and the motor 29 running. During its running period the motor 29 will progressively adjust the wiper of potentiometer 32 to vary the output signal thereof thereby to vary the portion of the total signal impressed on the controller 12 which is due to the potentiometer 32. In the case of heating, the temperature in the furnace chamber will therefore be increased to increase the thermocouple voltage to the point necessary to satisfy the controller 12. The rate at which this change occurs varies with the proportion of a complete time cycle as determined by the setting of the range potentiometer 51 during which the motor is running as determined by the setting of the rate potentiometer 56. It will be noted that when the total range is adjusted by adjusment of the potentiometer 44, the potentiometer 51 will be simultaneously adjusted to vary the length of the individual time cycles.

When the control apparatus has operated through the full range for which it is adjusted, the motor 29 will open the switch 25 to shut off the operation of the motor and will also move the switch 31 to complete a circuit through the coil 14 thereby to open the switch 13 and terminate the heating cycle. Simultaneously with opening of the switch 25, the signal lamp 18 will be energized from line 16 through resistors 19 and 24 to indicate that the entire cycle is completed.

For cooling the same operation would occur except that the potentiometer 32 would be adjusted to provide minimum voltage at the start of the operation and an increasing volage as the operation progresses thereby to reduce the portion of the signal going to the controller 12 which is contributed by the thermocouple 15. Other operations can be controlled in a similar manner by substituting for the thermocouple 15 a different type of voltage producing device representative to the condition whose rate of change is to be controlled.

It will thus be seen that with the present apparatus, the rate of change of substantially any desired condition can be accurately regulated and that the operation may be terminated at any predetermined set period. Therefore, while one specific apparatus and one specific operation have been described in detail, it will be understood that these are for the purposes of illustration only and are not to be taken as a definition of the scope of the invention, reference being had for this purpose to the appended claims.

What is claimed is:

1. A process program controller comprising a motor, control means driven by the motor, a pair of timing devices one of which functions on a shorter time cycle than the other, means operated by said one of the timing devices at the end of its time cycle to make the motor ineffective to drive the control means, and means operated by the other of the timing devices at the end of its time cycle to reset said one of the timing devices and to make the motor effective to drive the control means.

2. The controller of claim 1 in which the control means includes a first control device progressively adjusted by the motor and a second control device operated at the end of a predetermined total running thereof.

3. The controller of claim 1 including means responsive to a condition to be controlled to produce a control signal proportional to the condition and means responsive to the signal to control the condition, and in which the control means modifies the signal.

4. The controller of claim 3 including a control device operated by the motor at the end of a predetermined total running thereof to disable both the control means and the motor.

5. The controller of claim 3 in which the condition responsive means is a thermocouple to generate a voltage proportional to a temperature to be controlled and the control means is a potentiometer adjusted by the motor and electrically connected to the thermocouple.

6. A process program controller comprising an electric motor, a pair of timing circuits, one having a shorter time cycle than the other, means operated by said one of the timing circuits at the end of its time cycle to disable the motor, means operated by the other of the timing circuits at the end of its time cycle to reset said one of the timing circuits and to make the motor effective, and control means operated by the motor.

7. The controller of claim 6 including adjusting means to vary the time cycle of said other of the timing devices and second adjusting means connected to the first named adjusting means for simultaneously adjusting the range of effectiveness of the control means.

8. A process program controller comprising an electric motor, a pair of timing circuits, one having a shorter time cycle than the other, means operated by said one of the timing circuits at the end of its time cycle to disable the motor, means operated by the other of the timing circuits at the end of its time cycle to reset said one of the timing circuits and to make the motor effective, a potentiometer connected to the motor to be adjusted thereby, an adjusting device to vary the time cycle of said other of the timing devices, and a second adjusting device connected to the first named adjusting device for adjustment simultaneously therewith for varying the total voltage across the potentiometer.

9. A process program controller comprising an electric motor, a pair of timing circuits, one having a shorter time cycle than the other, means operated by said one of the timing circuits at the end of its time cycle to disable the motor, means operated by the other of the timing circuits at the end of its time cycle to reset said one of the timing circuits and to make the motor effective, a voltage adjusting device connected to the motor to be adjusted thereby to produce a first signal voltage, a voltage producing device responsive to a condition to be controlled to produce a second signal voltage, said devices being interconnected to produce a composite signal voltage, and control means for the condition responsive to the composite signal voltage.

10. The controller of claim 9 including a control device operable by the motor after a predetermined total running thereof to disable the motor and the control means.

11. A process program controller comprising an electric motor, a pair of timing circuits, one having a shorter time cycle than the other, means operated by said one of the timing circuits at the end of its time cycle to disable the motor, means operated by the other of the iming circuits at the end of its time cycle to reset said one of the timing circuits and to make the motor effective, a potentiometer connected to the motor to be adjusted thereby, a thermocouple responsive to a temperature to be controlled to produce a voltage proportional to the temperature, connections between the potentiometer and thermocouple whereby their voltages are added to provide a signal voltage, and control means for the temperature responsive to the signal voltage.

12. The controller of claim 11 including adjusting means for varying the time cycle of said other of the timing circuits, and second adjusting means operable simultaneously with the first named adjusting means to vary the voltage across the potentiometer.

References Cited by the Examiner

UNITED STATES PATENTS

| 2,409,136 | 10/1946 | Lilja | 236—46 |
|---|---|---|---|
| 2,410,384 | 10/1946 | Lindsay | 236—46 X |
| 2,495,844 | 1/1950 | Hornfeck | 236—46 |
| 2,574,383 | 11/1951 | Gaddis | 236—46 |
| 2,581,525 | 1/1952 | Gaddis | 236—78 |
| 3,043,517 | 7/1962 | Hanna | 236—46 |
| 3,274,375 | 9/1966 | Beltz | 236—46 |

WILLIAM J. WYE, *Primary Examiner.*